United States Patent [19]

Loutzenhiser

[11] Patent Number: 5,749,391
[45] Date of Patent: May 12, 1998

[54] CONDENSATE DRAINAGE SYSTEM FOR PNEUMATIC TANKS

[75] Inventor: Douglas J. Loutzenhiser, Lake Oswego, Oreg.

[73] Assignee: Freightliner Corporation, Portland, Oreg.

[21] Appl. No.: 601,190

[22] Filed: Feb. 14, 1996

[51] Int. Cl.$^6$ ........................................ F16T 1/00
[52] U.S. Cl. ........................... 137/204; 251/129.1
[58] Field of Search ................ 123/198 D; 137/203, 137/204; 251/129.1

[56] References Cited

U.S. PATENT DOCUMENTS

| | | | |
|---|---|---|---|
| 1,434,637 | 11/1922 | Tuck | 251/129.1 |
| 3,575,199 | 4/1971 | Beattie | 137/203 |
| 3,814,376 | 6/1974 | Reinicke | 251/65 |
| 4,043,353 | 8/1977 | Shirey | 137/204 |
| 4,261,382 | 4/1981 | Bridges | 137/187 |
| 4,336,821 | 6/1982 | Frantz et al. | 137/187 |
| 4,505,427 | 3/1985 | Bridges | 236/54 |
| 4,948,093 | 8/1990 | Sugawara et al. | 251/129.15 |
| 5,189,991 | 3/1993 | Humburg | 123/41.1 |
| 5,435,422 | 7/1995 | Chille, Sr. | 137/204 |
| 5,529,281 | 6/1996 | Brudnicki et al. | 251/129.1 |

OTHER PUBLICATIONS

Bendix Heavy Vehicles Systems Group Service Data Brochure SD-03-63, 2 pages.
Stark Manufacturing, Electronic Air Dryer/Purifier System Brochure, 2 pages (Oct. 1992).
Clear Drain Transportation Product Specialties, ClearDrain Timer Model Brochure, 6 pages (Jan. 1992).

*Primary Examiner*—Noah Kamen
*Attorney, Agent, or Firm*—Klarquist Sparkman Campbell Leigh & Whinston

[57] ABSTRACT

A condensate drainage system for pneumatic tanks is disclosed. Large vehicles typically use compressed air for operating various vehicle functions such as its brakes. In conjunction with the use of compressed air there is provided a pneumatic system including a compressor and pneumatic storage tanks. Because of the properties of compressed air, it is necessary to drain condensates and contaminants from the pneumatic storage tanks in order to prevent the condensates and contaminants from migrating throughout the air system, and interfering with the operation of, the brakes. Accordingly, electrically controlled drain valves are connected to the pneumatic tanks for purging condensate and contaminants. A logic controller which receives inputs from sensors and determines an engine status controls the operation of the drain valves so as to optimally purge condensates and contaminants. The controller includes a CPU, programmable memory, and a timer. A push button control is also provided to override timing functions within the controller.

24 Claims, 5 Drawing Sheets

CONDENSATE DRAINAGE SYSTEM FOR PNEUMATIC TANKS

BACKGROUND OF THE INVENTION

1. Field of the Invention

This invention pertains to drainage systems for draining condensate and contaminates from pneumatic tanks and lines. More particularly, this invention pertains to electrically controlled condensate drainage systems for land vehicles.

2. Description of the Related Art

Some vehicles have pneumatic systems for operating vehicle functions such as brakes. It is important that the air be dry and free of contaminates when it operates the brakes and other systems. An exemplary prior art pneumatic system 10, as used on highway tractors, is shown schematically in FIG. 1. It includes a primary tank 12, secondary tank 14 and supply tank 16 that receives pressurized air from a compressor 20 after it passes through an air dryer 18 to desiccate the air. The system further includes feedback line 26 and a governor 28 for controlling the compressor. Check valves 30 control the direction of air flow into the primary tank 12, and the secondary tank 14.

Figure 1:
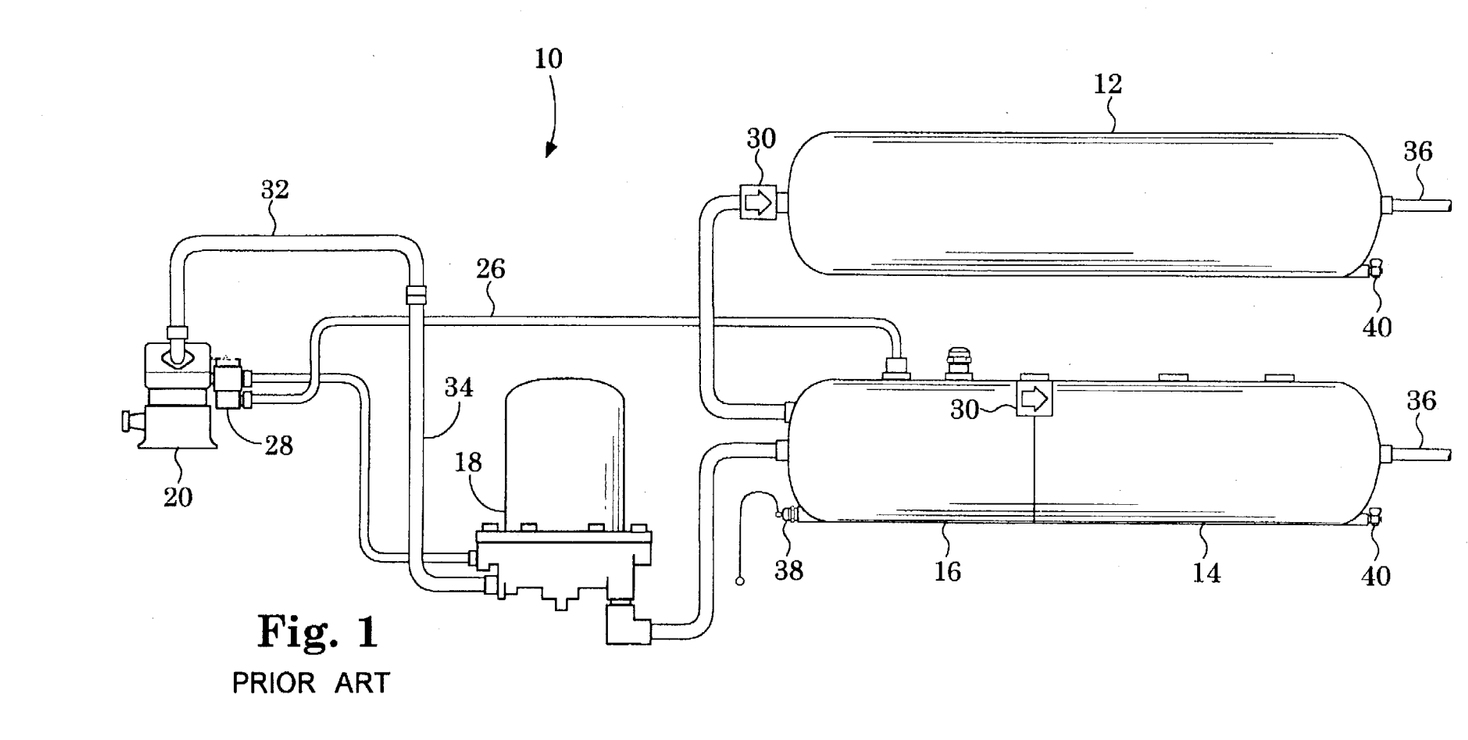
FIG. 1 is a schematic representation of a prior art pneumatic system used on heavy vehicles such as tractor trailer combinations.

Supply tanks are commonly known as wet tanks because pressurized air first expands therein causing substantial condensate to collect at the bottom of the tank. Accordingly, the primary and secondary tanks receive air from the supply tank through respective check valves 30. Outlets 36 from the primary and secondary tanks supply pressurized air to the vehicle's pneumatic systems such as the brakes (not shown). All of the pneumatic tanks include a drain valve 38 or petcocks 40 for manually draining condensate from the pneumatic tanks.

The prior art system described above and shown in FIG. 1 has many deficiencies. The air dryer 18 is expensive and frequently fails, requiring maintenance. The desiccant also becomes contaminated and requires replacement. Additionally, the drain valves on the pneumatic storage tanks must be manually operated to drain off condensate and contaminants that are collected therein.

One solution to the problems of the prior art system 10 was to use automatic drain valves in place of the manual valve 38 and petcocks 40. One such drain valve is disclosed by Norvill Industries of Lumberton, N.J., as a Clear Drain™ solid-state timer, which pneumatically connects to a wet tank and secondary tank to open a drain valve for five seconds every one hour to discharge condensates from the system. The timer unit is connected to the vehicle's power source and is switched through the ignition key.

When the vehicle is turned off, the drain valve opens to discharge all air pressure and condensates from the wet tank. Pressure is maintained in the secondary tank by check valves. The Clear Drain™ valve improves on the prior art of FIG. 1, but it does not allow for discharging condensate and contaminants from the secondary tank and does respond to different operational conditions. The Clear Drain™ system can only measure time and sense whether the ignition key is on or off.

Additionally, long-haul vehicle operators frequently leave their vehicle running while they sleep in order to take advantage of the vehicle systems such as cabin heat. While the vehicle is running, the Clear Drain™ valve would continue to operate by purging moisture from the wet tank every hour and causing substantial noise as pressurized air escapes through the drain valve's nozzle, potentially interfering with the vehicle operator's sleep.

Accordingly, it is desirable to provide an electrically controlled drain valve that senses and logically operates the drain valve in accordance with the vehicle status.

SUMMARY OF THE INVENTION

The present invention overcomes the deficiencies of the prior art by providing a condensate drainage system having electrically controlled drain valves and a logic controller which senses one or more vehicle parameters to determine a vehicle status. Based upon the vehicle status, the controller operates the drain valves according to a predetermined or selectable sequence of operations.

In the preferred embodiment of the present invention developed by the inventor, the electrically controlled drain valve is attached to a pneumatic tank. It includes a solenoid-operated valve piston which opens and closes a valve outlet port. A source of electrical energy is required to move the valve piston between its open and closed positions, but in the absence of the electrical signal, the valve piston will stay in the position to which it was last moved. The drain valve also includes a thermostatically controlled heater to prevent freezing of collected condensate in cold conditions. It should be noted that any valve responsive to the engine status as explained below is within the scope of the present invention.

The controller receives a signal from a sensor and determines an engine status. In the preferred embodiment, the sensor reports engine RPM, and the controller determines the engine status is either off, idling, or running.

When the engine status is changed to off, the controller begins a timer sequence and opens a supply tank valve and the primary and secondary tank valves according to a predetermined or selected schedule. Preferably, the supply tank will be purged soon after "off" is detected. The primary and secondary tank valves may be kept closed for a significant period of time, such as up to two hours or more after the engine is turned off so that air pressure will not be lost in those tanks during short stops. After the timing sequence has elapsed and all tanks have been purged, the drain valves are maintained in an open position until the engine is restarted.

If the controller determines that the engine status is idling, then the controller will initially close the drain valves and maintain them in a closed position until the engine status changes (e.g., vehicle is turned off or begins moving). This idling sequence allows the pneumatic tanks to build up air pressure while the vehicle is warming up. This sequence also allows the vehicle operator to leave the vehicle running during extended rest stops without having the system periodically purging the tanks, which would cause noise likely to wake a sleeper.

When the controller senses that the engine status is running (e.g., higher RPMs), it initially closes all the drain valves and begins a timing sequence. After a predetermined amount of time, the controller will open the drain valves to purge the condensates and contaminants. The valves are left open for a short time, for example up to about five seconds or more, and then the controller closes the drain valves. The cycle is repeated while the engine status is running.

A manual control is available at anytime, typically, for use in overriding the closed position in order to momentarily open the drain valves to purge condensates.

Various advantages and features of novelty which characterize the invention are particularized in the claims forming a part hereof. However, for a better understanding of the invention and its advantages, reference should be had to the drawings and to the accompanying description in which there is illustrated and described preferred embodiments of the invention.

DETAILED DESCRIPTION OF THE PREFERRED EMBODIMENTS

Figure 2:
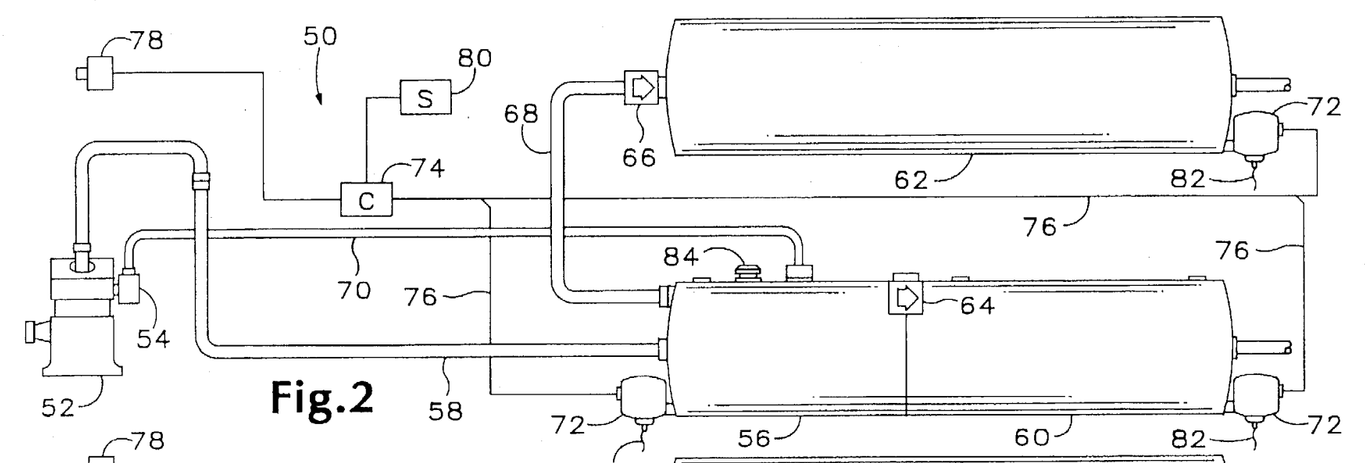
FIG. 2 is a schematic representation of a preferred embodiment of a pneumatic system of the present invention including electrically controlled drain valves and a logic controller.

With reference to FIGS. 2 and 4–6, a preferred embodiment of the present invention will be described. FIG. 2 discloses a pneumatic system 50 having an air compressor 52 with a governor 54. The compressor supplies pressurized air to a supply tank 56 (also known as a wet tank) along air conduit 58. From the supply tank 56, pressurized air is supplied to a secondary tank 60 and a primary tank 62 through check valves 64 and 66, respectively. The check valves 64, 66 allow air to pass in one direction only; the direction of flow is represented by the arrows in the figures.

Pressurized air is delivered to the primary tank 62 from the supply tank by means of an air conduit 68. A feedback air line 70 delivers air pressure from the supply tank to the governor 54 to control operation of the compressor 52. The supply tank 56 also includes a pressure valve 84 to bleed excess pressure from the supply tank.

An electrically controlled drain valve 72 is attached to each of the pneumatic tanks 56, 60 and 62, and each valve is electrically connected to a controller 74 by means of electrical wires 76. The controller is electrically connected to a push button or switch 78 that is preferably mounted in a cab of a tractor. The controller is also connected to one or more sensors 80 for sensing vehicle or engine operating parameters. In addition, the controller 74 is connected to a power source (not shown) such as the vehicle's storage cells or alternator. The drain valves 72 may also include a lanyard 82 for manually closing the drain valves. Although electrically controlled drain valves are preferred, pneumatically or otherwise controlled drain valves may be used. Also, the valves may be directly or indirectly electrically controlled.

Comparison of the present invention of FIG. 2 with the prior art of FIG. 1 reveals that the air dryer is preferably absent. Because of the efficiency of the present invention no air dryer is needed to meet operational requirements, although one may be included.

Figure 4:
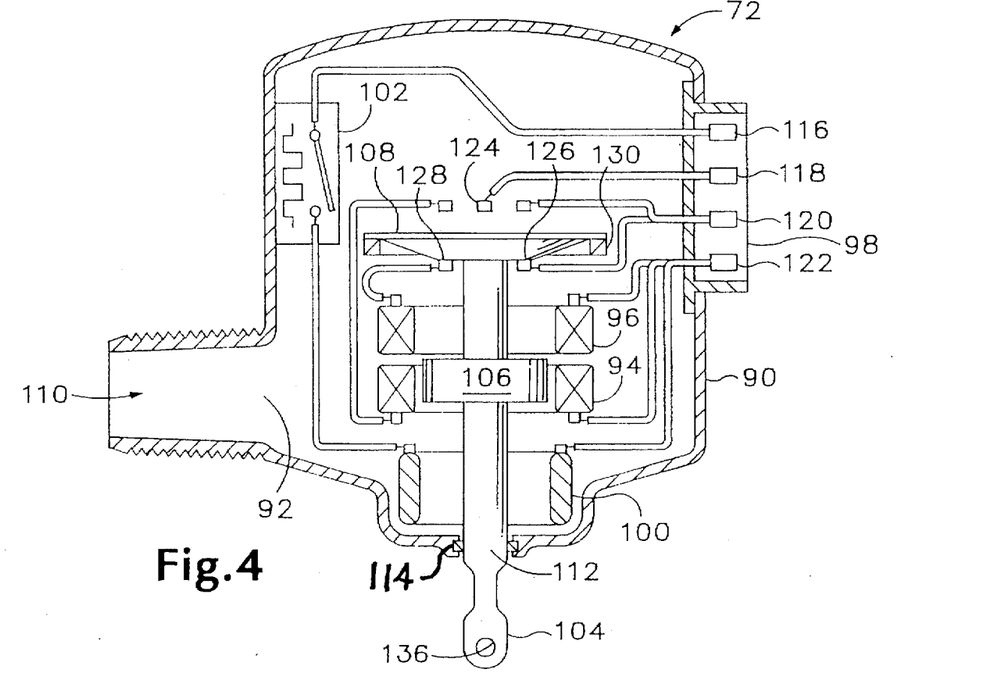
FIG. 4 is a cross-section view through a preferred embodiment of an electrically controlled drain valve in a closed position.
Figure 5:
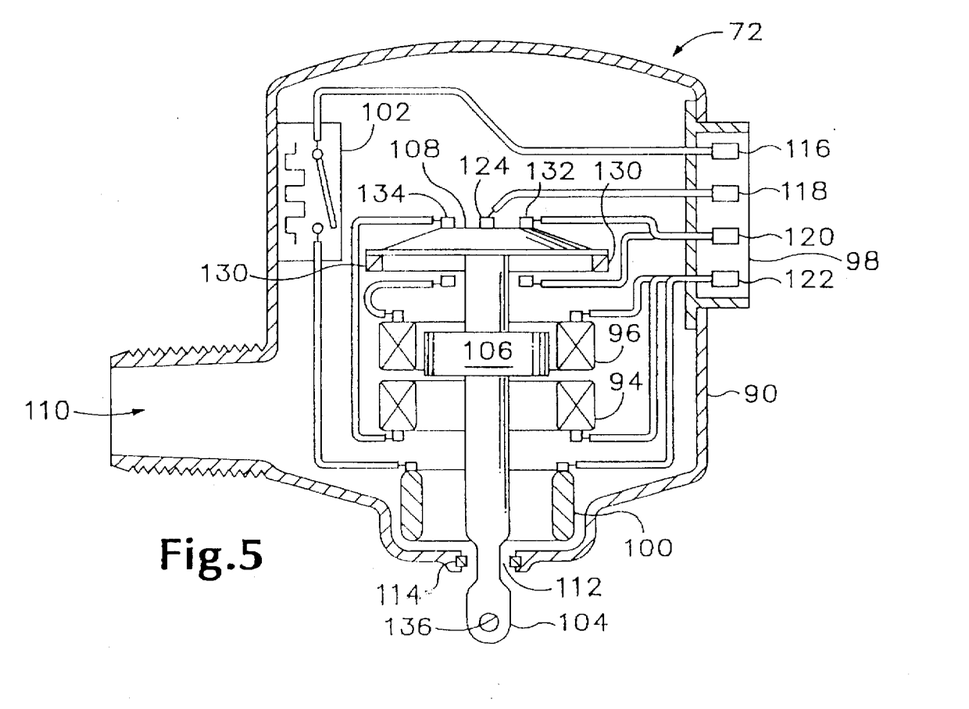
FIG. 5 is a cross-section view of the drain valve of FIG. 4 wherein the valve is in an open position.

An embodiment of the drain valve of the present invention is shown in diagrammatic cross-section in FIGS. 4 and 5. Again, other suitably controlled valves may also be used as the invention is not limited to this specifically illustrated form of valves. It includes a body 90 that encloses a chamber 92. Within the chamber are solenoids 94 and 96, and electrical connections to an electrical interface panel 98. Also within the chamber, is a heater 100 which is switched through thermostat 102. The heater and thermostat also include electrical connections to the electrical panel 98.

A piston valve 104 is located in chamber 92 and extends through the solenoids 94, 96. The piston valve includes a ferromagnetic collar 106 and a fixedly attached metallic dish 108, which is "dished" downward when the valve piston is in its open position and dished upward when the valve piston is in its closed position. The rim of the dish 108 is captured by a structural rib 130 formed on the valve body 90 so that only the center of the dish moves up and down with the valve piston.

An inlet port 110 and an outlet port 112 are provided in the drain valve 72 to receive and discharge, respectively, condensate. The outlet port includes a seal 114 that circumscribes the opening to seal against the piston valve 104 when the piston valve is in the closed position.

The electrical panel 98 includes terminals 116, 118, 120 and 122. A connector (not shown) is adapted to interface and attached to the electrical panel 98 thereby electrically connecting the terminals 116–122 to the controller 74.

Terminal 122 is a common ground terminal for all electrical components in the valve 72.

Terminal 116 connects to the thermostat 102 for supplying electrical energy to the heater 100. Terminal 116 can be maintained at a positive potential at all times and the heater will be switched on and off in accordance with the effect of ambient temperature the thermostat 102.

Terminal 118 is a position sensor which can detect whether the metallic dish 108 is touching its contact pad 124.

Terminal 120 serves as a solenoid energization terminal. When power is supplied to terminal 120 one of the two solenoids 94 or 96 is energized thereby moving the ferromagnetic collar 106 and with it the valve piston 104 into an alternate position from its position before terminal 120 was energized. The operation of the electrically controlled drain valve 72 will now be explained.

FIG. 4 shows the drain valve in its closed position wherein the port 112 is sealed, thereby hermetically sealing the chamber 92 from the ambient atmosphere. Condensate from one of the pneumatic tanks will flow into inlet port 110 and collect at the lowest part of the chamber 92. When the controller determines that it is time to open the outlet port 112, it raises the electrical potential at terminal 120, and current is communicated to pad 126, which is in contact with the metallic dish 108. Current is conducted through the metallic dish 108 to pad 128 and from there is conducted to solenoid 96. The solenoid is then energized by the flow of current, thereby attracting the ferromagnetic collar 106 and causing the collar and valve piston 104 to move upward forcing the metallic dish 108 to become downwardly dished and moving it into contact with pads 132 and 134.

The electrical current is supplied to terminal 120 for a short duration and is terminated before the metallic dish 108 makes contact with the pads 132 and 134. Once the valve piston 124 has been moved upward, re-dishing the metallic dish 108, the outlet port 102 is open and the valve is configured as shown in FIG. 5.

The structural properties of metallic dish 108 will hold the valve piston in its selected position until a sufficient force is exerted upon it to force the metallic dish 108 to "re-dish" into its alternative configuration. Thus, no energy is required to keep the valve piston 104 in its open or closed positions.

Energy is only required to move the valve piston from one position to the other.

When the drain valve 72 is open as shown in FIG. 5, the controller can close it by again raising the electrical potential at the terminal 120 so that the current is conducted to pad 132 and through the metallic dish 108 to the pad 134 thereby energizing solenoid 94. This will generate an electromagnetic force on the ferromagnetic collar 106, moving it downward and thereby moving the valve piston 104 into its closed position as shown in FIG. 4.

The valve piston 104 may also be moved manually by pushing it upward to open the outlet port 112 or pulling it down to close the port. The downward movement of the valve piston 104 may be assisted by pulling on the lanyard 82 connected to a hole 136 located at an end of the valve piston.

Another suitable drain valve is manufactured by GT Development of Tukwila, Wash., as part No. GTD4150-1. Other drain valves may also be suitable if they provide the desired characteristics of opening and closing in response to an electrical signal. It is further desirable, but not necessary, to have a drain valve remain in its set position, be it open or closed, without a continuous electrical signal.

As noted above, the system 50 includes the controller 74 which is connected to the manual push button 78 and at least one sensor 80. The controller is also connected to a power source (not shown). The sensor provides electrical information to the controller which the controller uses to determine an engine status. In a preferred embodiment, the sensor senses engine revolutions per minute (RPM) and the controller determines engine status by the number of RPMs. Alternatively, the controller could receive sensor information such as vehicle speed, hydraulic pressure, alternator current, ambient temperature, oil pressure, or any other variable that indicates an operational parameter associated with the vehicle.

Figure 6:
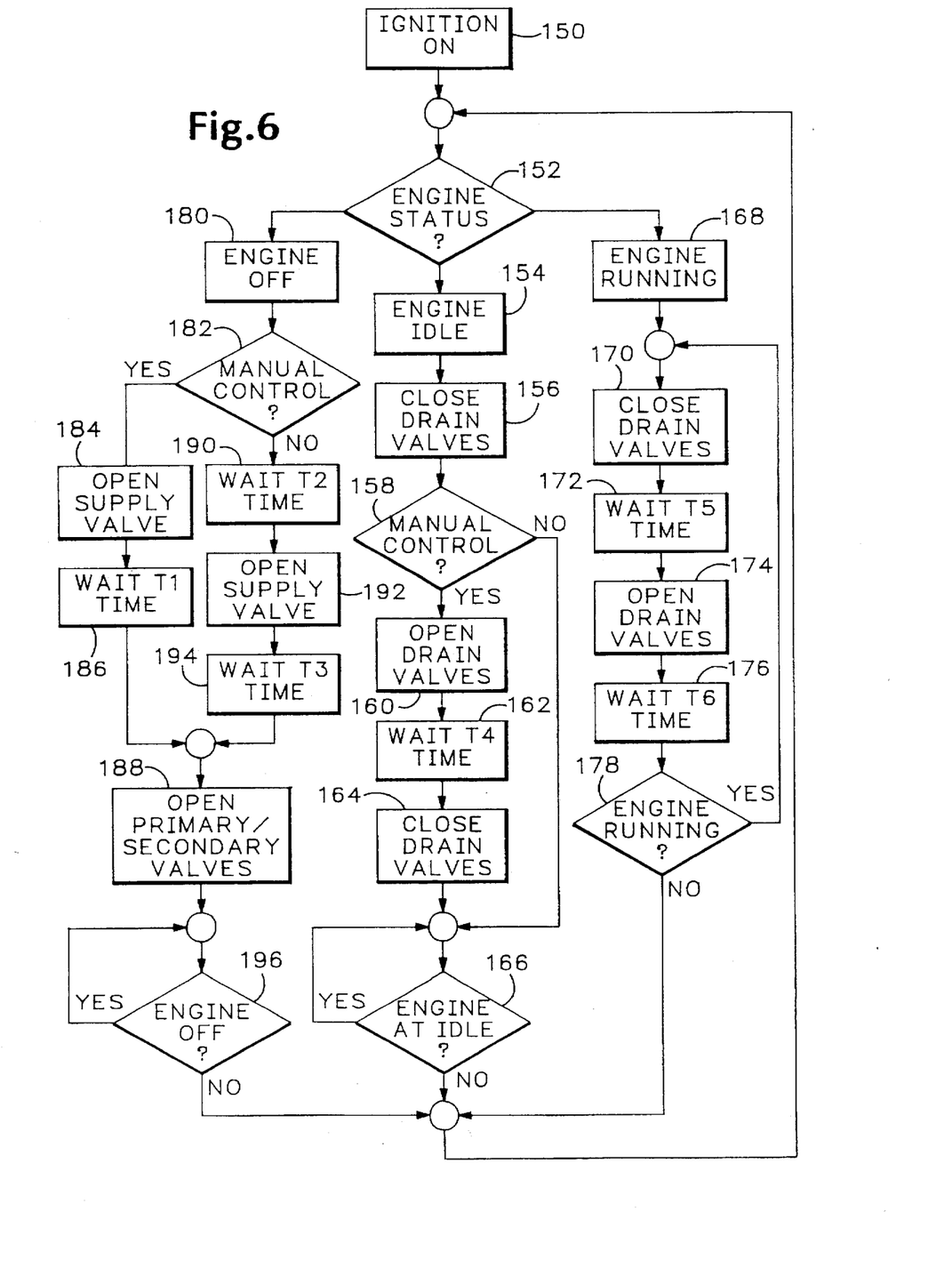
FIG. 6 is a logic flow diagram representing operational steps of a controller of the present invention.

The controller 74 is programmed to logically control the drain valves 72 in response to the sensed engine status or other vehicle parameters. FIG. 6 represents the preferred logic flow of the controller. The controller becomes operational at 150 and begins receiving sensor information to determine an engine status at 152.

When a vehicle is first started, it is likely that the operator will idle the engine for several minutes to warm it up and allow air pressure to build up in the pneumatic tanks 56, 60, 62. If the controller determines that the engine status is "idle" at block 154, it will then send a signal to close the drain valves 72 at block 156. Thereafter the controller will check whether the manual push button 78 has been activated at 158 and if it has been activated, the controller will send a signal to open the drain valves at 160 and begin a timer. The controller waits time T4 at 162 and then closes the drain valves at 164. Although variable, time T4 is preferably between two and five seconds. Ideally, time T4 is no longer than required to allow all the condensate and contaminants to be purged from the tanks with a minimum loss of air pressure.

If the controller determines that the manual push button has not been operated at 158, control is passed to block 166 where the controller determines if the engine is still at idle. If so, the controller will loop, or dwell, until the engine no longer meets the idle condition. As noted above, one preferred sensor input is engine RPM. Accordingly, engine idle is preferably defined as an engine status in which the engine RPM is between zero and 1,000 RPMs.

When the controller determines that the engine is no longer idling, control is returned to block 152 wherein the controller again determines an engine status. Under normal operation this would likely occur after the truck has warmed up sufficiently and the driver begins driving the vehicle. Accordingly, the controller would determine that the engine status is "running" at block 168 and close the drain valves at 170. The controller then begins a timing sequence and dwells for time T5 at 172, after which it opens the drain valves at 174. Time T5 is approximately 30 minutes but a preferred satisfactory range is for T5 to be greater than 15 minutes and not longer than two hours. However, operationally, T5 could be any value between several minutes and several hours.

After the controller has opened the drain valves at 174, it begins a timing sequence and waits time T6 at 176 after which the controller determines that the engine is still running at 178. If the truck is still running, control is returned to block 170 wherein the drain valves are closed. T6, like T4, represents the time that the drain valve is open to purge condensates and contaminants from the pneumatic tanks, and it would likely be equal to T4. As noted above, in connection with T4, although variable, the preferred period of time during which the valve is kept open is between two and five seconds.

When the controller determines that the engine is not running at 178, control is returned to block 152 wherein the controller again determines the engine status. Often, the operator will simply have stopped the vehicle for a traffic light or short break and the engine will remain idling and the controller will return operation to the engine idle branch beginning at block 154.

Alternatively, if the controller determines the engine status is off, control is passed to block 180, and the controller will query whether the manual control has been operated at 182. If the manual control has been operated, the controller will open the supply tank valve at 184, after which it will wait a time T1 at 186. The controller 74 will then open the primary and secondary tank valves at 188. Preferably, time T1 is approximately one minute. However, operationally T1 could be as little as several seconds or up to several hours.

If the controller determines that the manual control has not been actuated at 182, it initiates two timers T2 and T3. After time T2 at 190, the controller will open the supply tank valve at 192. After time T3, the controller will open the primary and secondary tank valves at 188. Time T2 is preferably approximately 30 minutes to allow a vehicle operator time to stop and perform routine chores without losing pressure. However, T2 could be as little as several minutes and up to a time equal to time T3. Preferably, T3 is approximately two hours, but may be longer or shorter.

Thereafter, the controller will query whether the engine is off at 196 and continue to loop for as long as the engine condition is determined off. If the controller determines that the engine condition is not off, control is returned to block 152 where the controller once again determines the engine's status and assigns control to block 180, 154, or 168, accordingly.

Figure 3:
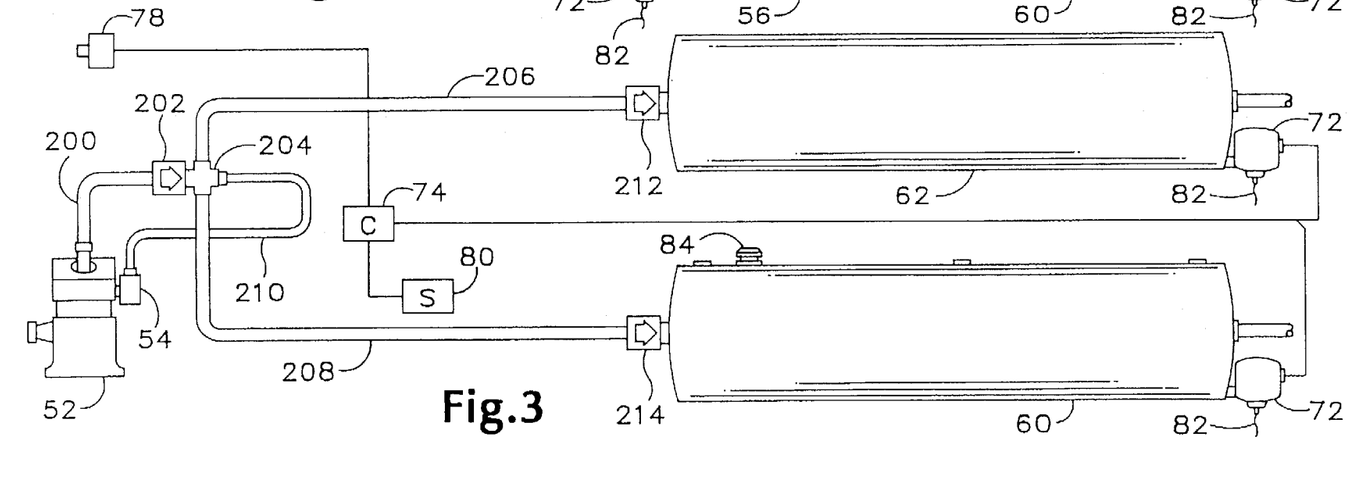
FIG. 3 is an alternative embodiment of a pneumatic system of the present invention having no supply tank.
Figure 7:
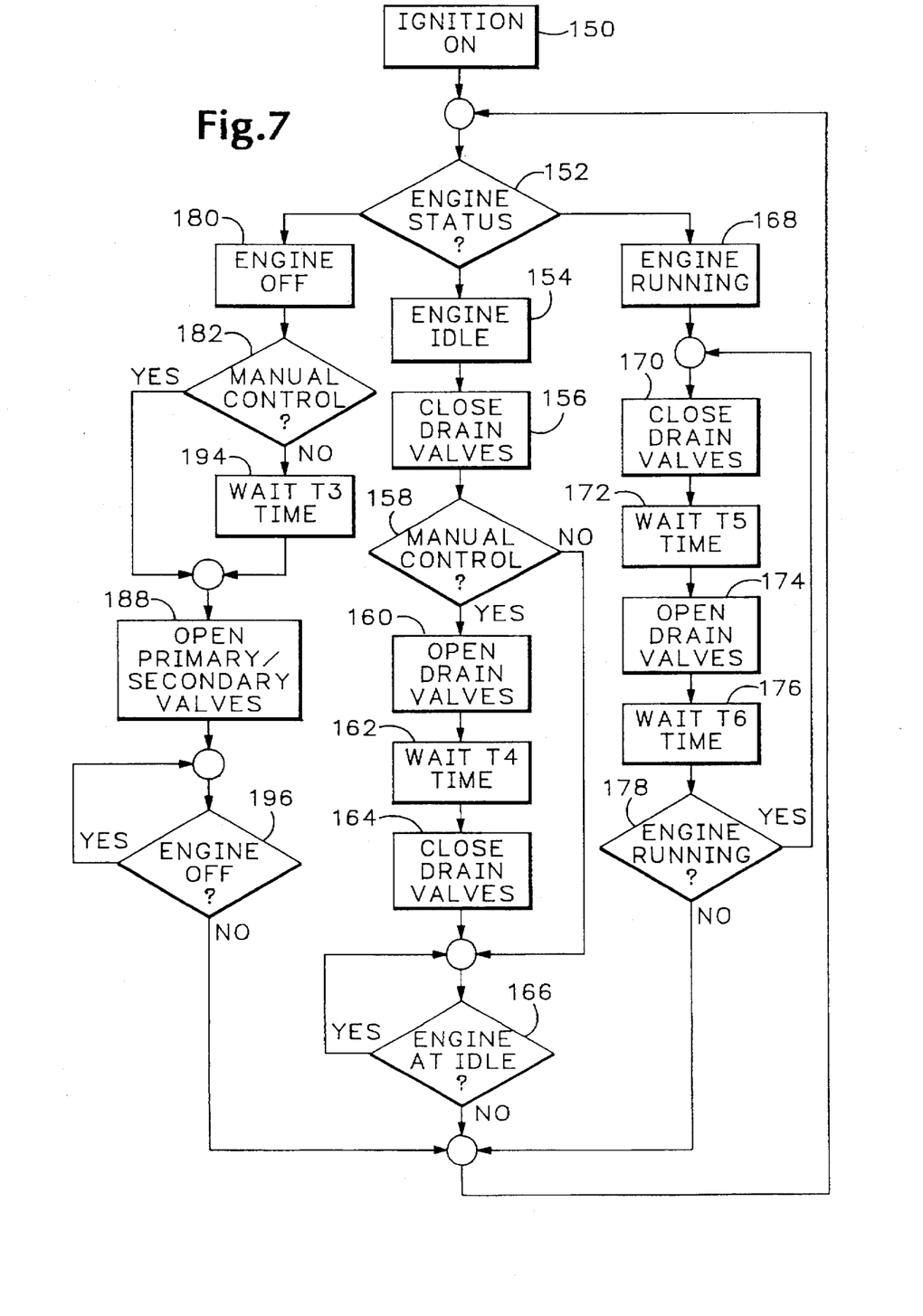
FIG. 7 is a logic flow diagram representing operational steps of the controller for an alternative embodiment pneumatic system such as is disclosed in FIG. 3.

An alternative embodiment of the present invention is schematically depicted in FIG. 3 and operationally depicted in the flow chart of FIG. 7. Where components and operational steps in this alternative embodiment are similar to components or steps of the above-described embodiment, the same reference numerals are used.

In this alternative embodiment, there is no supply tank 56, which may not be necessary due to the efficiency of the condensate draining system of the present invention. The primary purpose of the supply tank in prior art systems was to collect the bulk of the condensates and physically separate the condensates from the primary and secondary tanks that feed the pneumatic systems. In the present embodiment, it is feasible to rely upon the draining system of the present invention to purge condensate and contaminants from the primary tank 62 and the secondary tank 60.

In this embodiment, the compressor 52 will provide pressurized air into fluid conduit 200 which will pass through a check valve 202 into a four-way coupler 204. Out of the four-way coupler 204 emerges fluid conduit 206 going to the primary tank 62 and fluid conduit 208 going to the secondary tank 60. In addition, a feedback conduit 210 provides feedback to the governor 54 to control operation of the compressor 52. Check valves 212 and 214 isolate air pressure in the primary tank 62 and the secondary tank 60 from the four-way coupler 204.

The primary and secondary tanks have electrically controlled drain valves 72. As before, the electrically controlled drain valves are electrically controlled by a controller 74 which includes manual push button 78 and at least one sensor 80.

This alternative embodiment is advantageous over the embodiment described in connection with FIG. 2 because it requires one less drain valve and a simpler secondary tank construction.

The preferred operational steps for the embodiment of FIG. 3 are shown in flow diagram format in FIG. 7. As before, the controller will receive a sensor signal and determine an engine status at 152. Also, as before should the controller determine that the engine status is idling or engine running, it will transfer control to blocks 154 or 168, respectively, and the controller will control the drain valves as described above.

However, in the event that the controller determines that the engine status is off at block 180, the controller will then determine whether the manual control push button has been activated at 182. If the push button has been activated the controller will immediately open the primary and secondary tank valves at 188. If the manual control push button was not activated, then the controller will wait a time T3 at 194. As described in connection with the operation shown in FIG. 6, T3 is preferably about two hours in duration, but may be shorter or longer depending upon the operational needs of the vehicle operator. After waiting time T3, the controller will open the primary and secondary tank valves at 188. The valves will remain open so long as the controller determines that the engine status is off. Should the engine status change, the controller will pass control back to block 152 wherein the controller receives a sensor signal and determines an engine status.

The controller 74 includes a programmable central processing unit (CPU) and a programmable memory such as EPROM. This allows programmable selection of the various time periods. Although less preferred, one could use a controller which permits programming by the operator of the vehicle to allow selection of time period to fit the truck operating conditions. The controller will draw power from the vehicle for operating the CPU and EPROM and the drain valves. It may include a transformer for supplying current to the drain valve heater and to operate the solenoids within the drain valve. Additionally, the controller will include input/output (I/O) devices for receiving signals from the sensors 80 and may further include A/D devices for converting analog signals to digital data. D/A converters may be used to convert the CPU's digital signals into analog signals for energizing the solenoids. The I/O devices may also receive a signal from the manual push button 78, which may likewise be converted to a digital signal. Further, the controller will be housed in an environmentally sealed enclosure and will be mounted in a suitable location to minimize road shocks and undue rain, dirt or vibration.

Drain valves having different designs may also be suitable for use in the present invention. By way of example, and not by way of limitation, the drain valve 72 could include means other than the metallic dish 108 for maintaining the position of the valve piston 104. In addition, the drain valve could include a different embodiment and arrangement of solenoids, valve piston 104 and ferromagnetic car 160. Further, a drain valve could be constructed using transducers other than the solenoids 94, 96 described above.

Numerous characteristics and advantages of the invention have been set forth in the foregoing description, together with details of the structure and function of the invention. The novel features hereof are pointed out in the appended claims. The disclosure is illustrative only, and changes may be made in detail, especially in matters of shape, size, and arrangement of parts within the principle of the invention to the full extent indicated by the broad general meaning of the terms in the claims.

I claim:

1. A condensate draining system for a pneumatic system of an engine powered vehicle, the vehicle having pneumatically operated components responsive to the pneumatic system, the system comprising:

(a) a drain valve connected to the pneumatic system, the drain valve having an open position for discharging condensate and a closed position for containing pressurized air within the pneumatic system; and (b) a controller having a logic system, the controller being coupled to the drain valve and being operable to control the position of the valve between open and closed positions; and (c) a sensor for sending an engine status signal indicative of a first operational engine status and a second operational engine status, the operational engine statuses relating to a status of the engine when the engine is running;

(d) wherein the controller receives the engine status signal and is operable to control the position of the drain valve according to a first schedule in response to the first operational engine status and a second schedule in response to the second operational engine status so as to prevent the accumulation of condensate in the pneumatic system.

2. The condensate draining system of claim 1 wherein the drain valve comprises:

(a) a body defining a chamber and having an inlet port and an outlet port;

(b) a port closer positioned within the chamber and movable between the closed position substantially blocking the outlet port and the open position not substantially blocking the outlet port; and (c) an electrically activated transducer within the chamber that is controllably coupled to the port closer, the transducer moving the port closer from the open position to the closed position in response to a first electrical signal from the controller and from the closed position to the open position in response to a second electrical signal from the controller.

3. The condensate draining system of claim 1 wherein the drain valve comprises:

(a) a body defining a chamber and having an inlet port and an outlet port;

(b) a port closer having a ferromagnetic portion and positioned within the chamber and movable between the closed position substantially blocking the outlet port and the open position not substantially blocking the outlet port; and (c) electrically activated solenoids located within the chamber and wherein the solenoids each define a central opening and the ferromagnetic portion is positioned within the central openings of the solenoids such that activation of the solenoids in response to electrical signals moves the port closer between the open and closed positions;

(d) a fluid heater located within the chamber;

(e) a position sensor located within the chamber that provides an electrical signal indicative of the position of the port closer; and (f) a mechanical retainer coupled to the port closer and operable to maintain the port closer in the open and closed positions, respectively, until respective electrical signals activate the solenoids.

4. The condensate draining system of claim 1 wherein the engine status signal can further determine when the engine is off and the controller causes the drain valve to open at least two minutes after the engine status signal indicates that the engine is off.

5. A condensate draining system for a pneumatic system of an engine powered vehicle, the vehicle having pneumatically operated components responsive to the pneumatic system, the system comprising:

(a) a drain valve connected to the pneumatic system, the drain valve having an open position for discharging condensate and a closed position for containing pressurized air within the pneumatic system; and (b) a controller having a logic system, the controller being coupled to the drain valve and being operable to control the position of the valve between open and closed positions;

(c) a sensor for sending an engine status signal indicative of an engine status, and wherein the controller receives the engine status signal and is operable to control the position of the drain valve in response to the engine status signal so as to prevent the accumulation of condensate in the pneumatic system;

(d) wherein the engine status signal is indicative of the number of revolutions per minute of the engine.

6. A condensate draining system for a pneumatic system of an engine powered vehicle, the vehicle having pneumatically operated components responsive to the pneumatic system, the system comprising:

(a) a drain valve connected to the pneumatic system, the drain valve having an open position for discharging condensate and a closed position for containing pressurized air within the pneumatic system; and (b) a controller having a logic system, the controller being coupled to the drain valve and being operable to control the position of the valve between open and closed positions;

(c) a sensor for sending an engine status signal indicative of an engine status, and wherein the controller receives the engine status signal and is operable to control the position of the drain valve in response to the engine status signal so as to prevent the accumulation of condensate in the pneumatic system;

(d) wherein the engine status signal indicates that the vehicle is moving and the controller controls the drain valve to open after a first time interval and close after a second time interval, the second time interval being of a sufficiently short duration to maintain sufficient air pressure within the pneumatic system to operate the pneumatically operated components of the vehicle.

7. The condensate draining system of claim 6 wherein the controller controls the drain valve to close and thereafter controls the drain valve to open after the first time interval, the first time interval having a first length of at least thirty minutes and to close after the second time interval, the second time interval having a second length which is shorter than the first length.

8. The condensate draining system of claim 6 wherein when the engine status signal indicates the engine is off the controller controls the drain valve to open after a third time interval.

9. The condensate draining system of claim 8 wherein the controller further includes a manual control which is manually actuatable to cause the controller to control the position of the drain valve at least to the open position, and when the engine status signal indicates that the vehicle is idling the controller controls the drain valve to close and upon actuation of the manual control the controller controls the drain valve to open and thereafter controls the drain valve to close after a time interval.

10. A condensate draining system for a pneumatic system of an engine powered vehicle, the vehicle having pneumatically operated components responsive to the pneumatic system, the system comprising:

(a) a drain valve connected to the pneumatic system, the drain valve having an open position for discharging condensate and a closed position for containing pressurized air within the pneumatic system; and (b) a controller having a logic system, the controller being coupled to the drain valve and being operable to control the position of the valve between open and closed positions; and (c) a sensor for sending an engine status signal indicative of an engine status, and wherein the controller receives the engine status signal and is operable to control the position of the drain valve in response to the engine status signal so as to prevent the accumulation of condensate in the pneumatic system;

(d) wherein the controller further includes a manual control which is manually actuatable to cause the controller to control the position of the drain valve at least to the open position, and when the engine status signal indicates that the vehicle is idling the controller controls the drain valve to close and upon actuation of the manual control the controller controls the drain valve to open and thereafter controls the drain valve to close after a time interval.

11. The condensate draining system of claim 10 wherein the time interval being of a sufficiently short duration to maintain sufficient air pressure within the pneumatic system to operate the pnuematically operated components of the vehicle.

12. A condensate draining system for a pneumatic system of an engine powered vehicle, the vehicle having pneumatically operated components responsive to the pneumatic system, the system comprising:

(a) a drain valve connected to the pneumatic system, the drain valve having an open position for discharging condensate and a closed position for containing pressurized air within the pneumatic system; and (b) a controller having a logic system, the controller being coupled to the drain valve and being operable to control the position of the valve between open and closed positions; and (c) a sensor for sending an engine status signal indicative of an engine status, and wherein the controller receives the engine status signal and is operable to control the position of the drain valve in response to the engine status signal so as to prevent the accumulation of condensate in the pneumatic system;

(d) wherein the controller further includes an operable manual control and the pneumatic system includes at least two pneumatic tanks each with a respective drain valve connected thereto and when the engine status signal indicates that the engine is off and the manual control is operated the controller controls a first at least one of the drain valves to open and thereafter controls a second at least one drain valve to open after a time interval.

13. The condensate draining system of claim 12 wherein the controller controls the first at least one drain valve to open after a first time interval and thereafter controls the second at least one drain valve to open after a second time interval.

14. The condensate draining system of claim 12 wherein the controller controls the first at least one drain valve to open after a time interval of at least 30 minutes and thereafter controls the second at least one drain valve to open after a time interval of at least 120 minutes.

15. A vehicle having a pneumatic system with a condensate draining system comprising a drain valve connected to the pneumatic system, the drain valve having an open position for discharging condensate and a closed position for containing pressurized air within the pneumatic system, a controller having a logic system, the controller being coupled to the drain valve and being operable to control the position of the valve between open and closed positions, a sensor for sending an engine status signal indicative of an engine status, the controller receiving the engine status signal, the controller being operable to control the position of the drain valve in response to the engine status signal so as to prevent the accumulation of condensate in the pneumatic system, and a cab having an interior cab including a manual control which is manually actuatable to cause the controller to control the position of the drain valve at least to the open position.

16. A pneumatic system for an engine powered vehicle, comprising:
(a) an air tank having an interior cavity for containing pressurized air;
(b) a drain valve in communication with the interior cavity of the air tank and configurable to an open state for discharging condensate from the air tank and a closed state for containing pressurized air in the air tank;
(c) a sensor for sending an engine status signal; and
(d) a controller in communication with the drain valve wherein the controller is responsive to the engine status signal and determines an engine status and the controller sends at least one signal to the drain valve to configure the drain valve into the open and closed states according to a predetermined schedule for the determined engine status, the drain valve responsive to the controller signal so that the drain valve moves into the open and closed position without pneumatic pressure to move the drain valve.

17. The pneumatic system of claim 16 wherein the drain valve comprises:

(a) a body defining a chamber and having an inlet port and an outlet port;
(b) a port closer positioned within the chamber and movable between a closed position substantially blocking the outlet port and an open position not substantially blocking the outlet port; and
(c) an electrically activated transducer within the chamber and controllably coupled to the port closer, the transducer moving the port closer to the open and closed positions in response to the at least one signal from the controller.

18. A pneumatic system for an engine powered vehicle, comprising:
(a) an air tank having an interior cavity for containing pressurized air;
(b) a drain valve in communication with the interior cavity of the air tank and configurable to an open state for discharging condensate from the air tank and a closed state for containing pressurized air in the air tank;
(c) a sensor for sending an engine status signal;
(d) a controller in communication with the drain valve wherein the controller is responsive to the engine status signal and determines an engine status and the controller sends at least one signal to configure the drain valve into the open and closed states according to a predetermined schedule for the determined engine status; and
(e) a cab having an interior portion including a manual control mounted therein which is manually actuatable to cause the controller to send a signal to configure the drain valve into at least the open state.

19. A pneumatic system for an engine powered vehicle, comprising:
(a) an air tank having an interior cavity for containing pressurized air;
(b) a drain valve in communication with the interior cavity of the air tank and configurable to an open state for discharging condensate from the air tank and a closed state for containing pressurized air in the air tank;
(c) a sensor for sending an engine status signal; and
(d) a controller in communication with the drain valve wherein the controller is responsive to the engine status signal and determines an engine status and the controller sends at least one signal to configure the drain valve into the open and closed states according to a predetermined schedule for the determined engine status, and wherein the engine status signal is indicative of the number of engine revolutions per minute.

20. A pneumatic system for an engine powered vehicle, comprising:
(a) an air tank having an interior cavity for containing pressurized air;
(b) a drain valve in communication with the interior cavity of the air tank and configurable to an open state for discharging condensate from the air tank and a closed state for containing pressurized air in the air tank;
(c) a sensor for sending an engine status signal; and
(d) a controller in communication with the drain valve wherein the controller is responsive to the engine status signal and determines an engine status and the controller sends at least one signal to configure the drain valve into the open and closed states according to a predetermined schedule for the determined engine status, and wherein the controller determines a first engine status and in response sends a first signal to configure the drain valve into the closed state and thereafter sends a second signal to configure the drain valve into the open state after a first time interval and thereafter sends a third signal to configure the drain valve into the closed state after a second time interval thereby purging condensate from the pneumatic system.

21. The pneumatic system of claim 20 wherein the controller further includes an operable manual override and the controller determines a second engine status and in response the controller sends a first signal to configure the drain valve into the closed state and in response to operation of the manual override the controller sends a second signal to configure the drain valve into the open state and thereafter sends a third signal to configure the drain valve into the closed state after a wait interval.

22. The pneumatic system of claim 21 wherein the controller determines a third engine status and in response sends a signal to configure the drain valve into the open state after a wait interval.

23. A pneumatic system for an engine powered vehicle, comprising:

(a) an air tank having an interior cavity for containing pressurized air;

(b) a drain valve in communication with the interior cavity of the air tank and configurable to an open state for discharging condensate from the air tank and a closed state for containing pressurized air in the air tank;

(c) a sensor for sending an engine status signal; and (d) a controller in communication with the drain valve wherein the controller is responsive to the engine status signal and determines an engine status and the controller sends at least one signal to configure the drain valve into the open and closed states according to a predetermined schedule for the determined engine status, wherein the pneumatic system further includes at least two air tanks and a respective number of drain valves attached to the tanks and the controller determines a third engine status and in response the controller sends a first signal to configure a first at least one drain valve into the open state after a first time interval and sends a second signal to configure a second at least one drain valve into the open state after a second time interval.

24. The pneumatic system of claim 23 wherein the controller further includes an operable manual override and wherein in response to operation of a manual override the controller sends a signal to configure a first at least one drain valve into the open state and thereafter sends a second signal to configure a second at least one drain valve into the open state after a time interval.

* * * * *